UNITED STATES PATENT OFFICE.

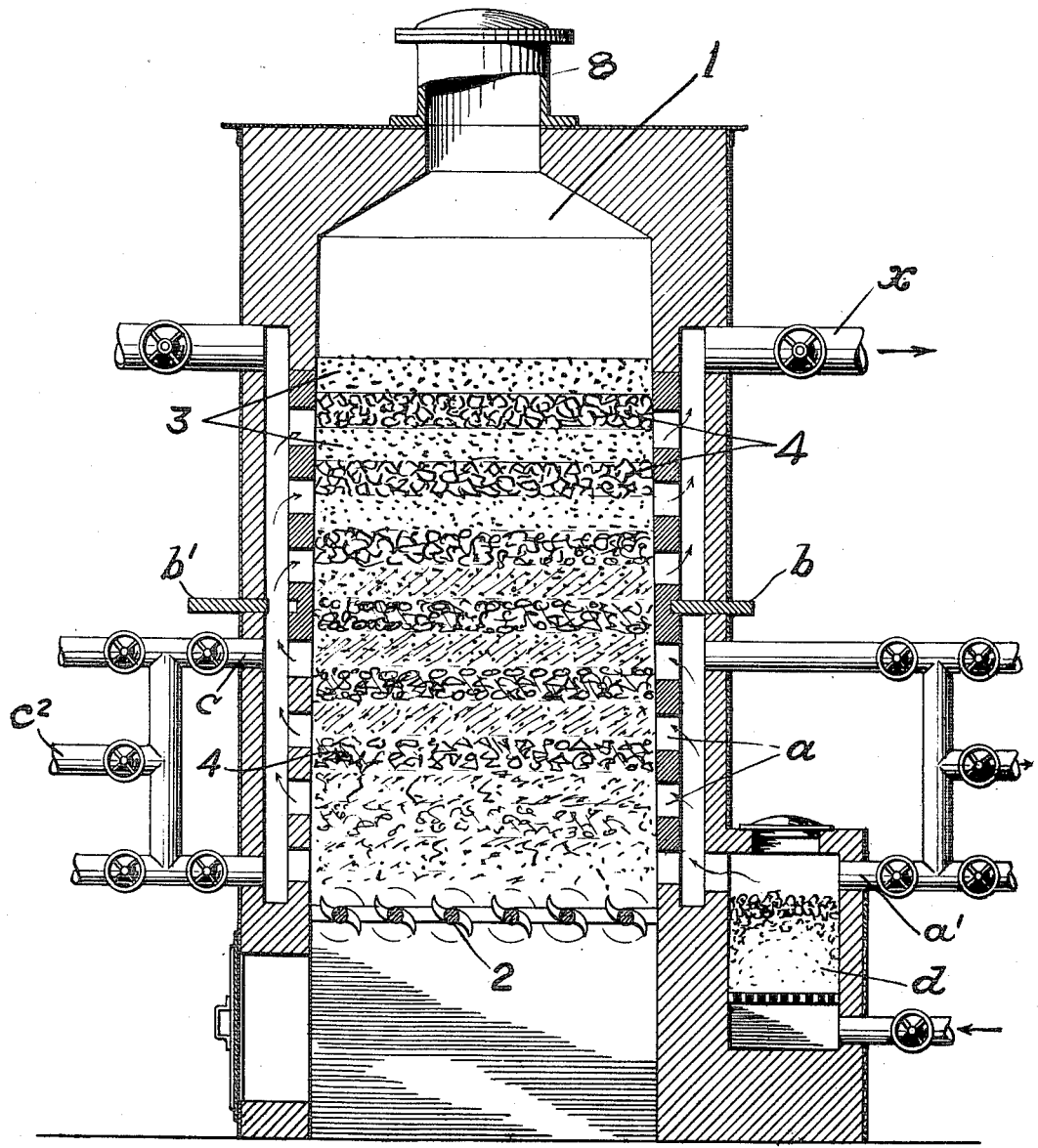

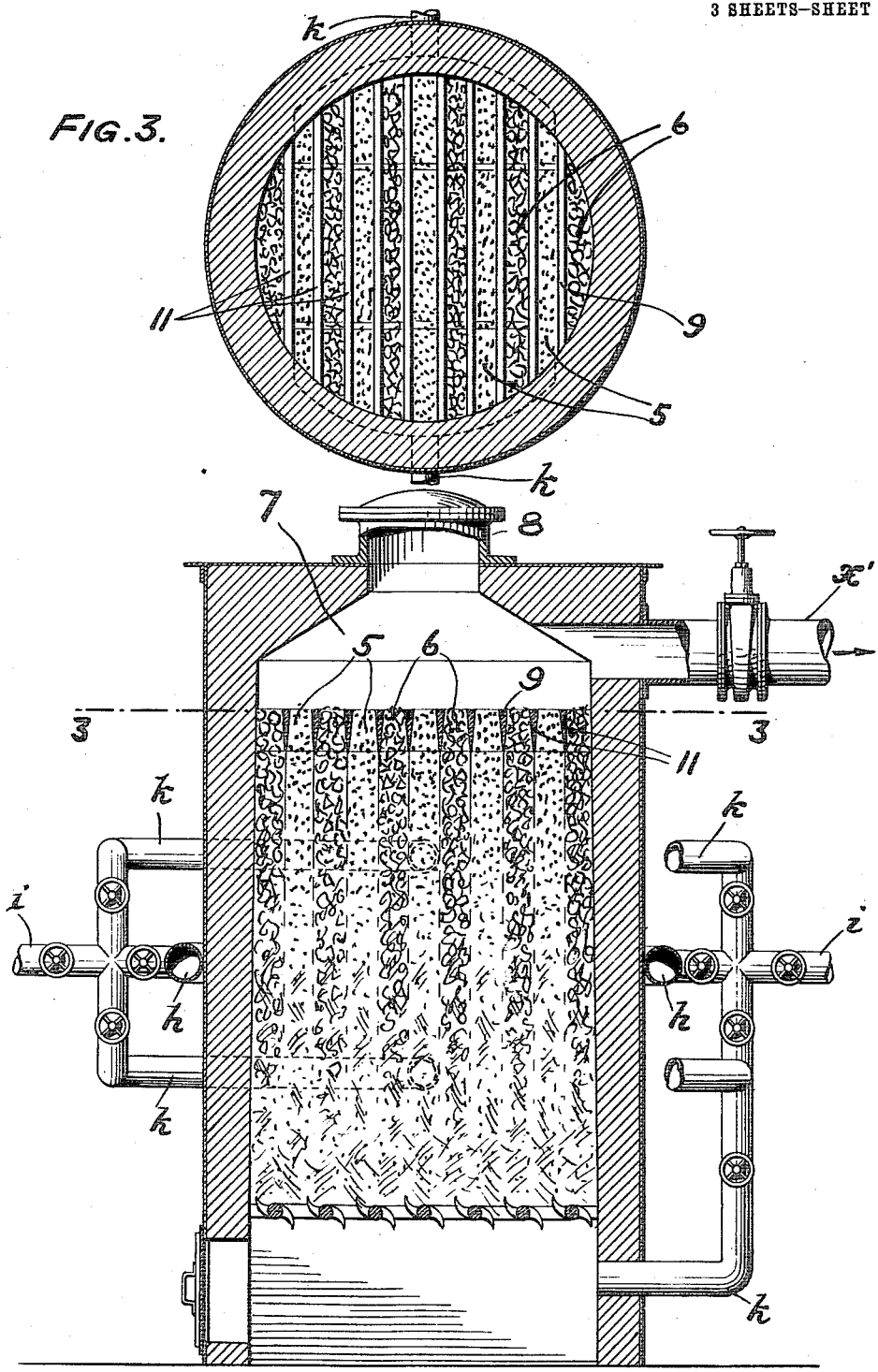

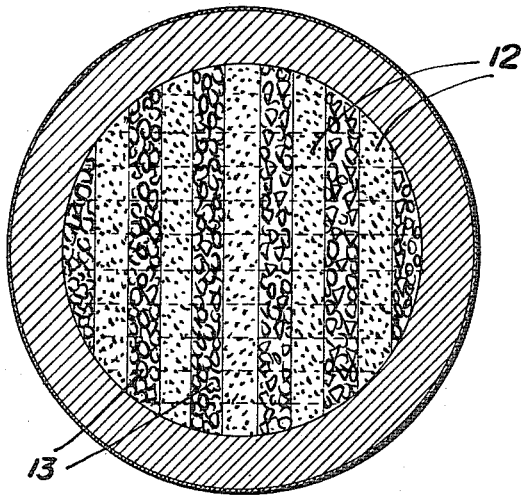
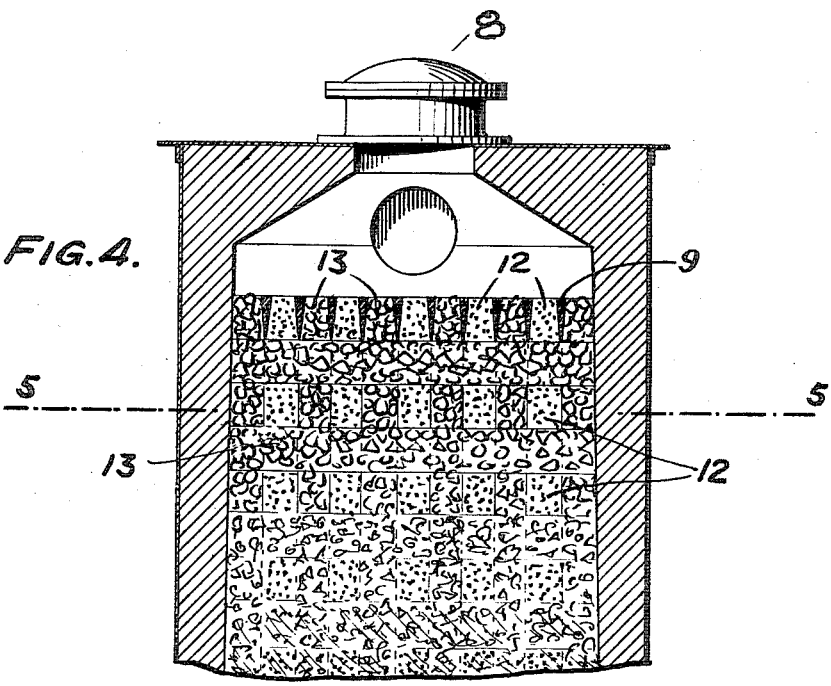

JOHN M. RUSBY AND OWEN B. EVANS, OF PHILADELPHIA, PENNSYLVANIA, ASSIGNORS TO THE UNITED GAS IMPROVEMENT COMPANY, OF PHILADELPHIA, PENNSYLVANIA, A CORPORATION OF PENNSYLVANIA.

DISTILLATION OF BITUMINOUS COAL AND THE LIKE.

1,030,333.     Specification of Letters Patent.    Patented June 25, 1912.

Application filed December 4, 1911. Serial No. 663,809.

*To all whom it may concern:*

Be it known that we, JOHN M. RUSBY and OWEN B. EVANS, citizens of the United States, residing at Philadelphia, Pennsylvania, have jointly invented certain new and useful Improvements in the Distillation of Bituminous Coal and the Like, of which the following is a specification.

The distillation of volatile matter from bituminous or "soft" coal, and other fuels or carbonaceous material containing such volatile constituents yields, as its products coke (fixed carbon) and gases and vapors; and has heretofore, to great extent,—and where it is desired to collect these gases and vapors for sale or other external use, solely,—been effected by inclosing these carbonaceous materials in various forms of retorts tightly closed, with the exception of an outlet for the delivery and collection of the gas, and effecting their distillation by the application of heat to the exterior of the retort. Consequently the heat necessary for the distillation can reach the interior of the retort only by the comparatively slow process of conduction through the walls of the retort. Furthermore, because of the high temperature that must be employed to effect the complete distillation of the carbonaceous material and the production therefrom of good gas and coke, these retorts must be made of material which is very refractory to, or infusible by, heat, and also incapable of destruction by oxidation or other chemical action; firebrick is the material very generally used. This firebrick is a very poor conductor of heat and is also brittle and weak, and the retorts must consequently be made of very considerable thickness in order to have necessary strength; in consequence of this thickness and the poor heat conductivity of the material of the retort walls, the flow of heat from their exterior to interior for the distillation of the carbonaceous material is very slow, and hence the distilling of any large quantity of carbonaceous matter per unit of time can only be effected by employing retorts of very large surface. These retorts, and their appurtenant and inclosing parts, or "setting," must therefore be of very large size, and are expensive in every item of construction; they are also subject to rapid deterioration, and are expensive in repair and maintenance; because of their large size the waste of heat to the atmosphere by radiation and conduction from the exterior of the "setting," is great; because the rapid heating of any one portion of the retorts or "setting" causes unequal expansion, resulting in their fracture and destruction, the heating or cooling of the retorts and "setting" in putting them into use, or out of use, must be very slow and uniform, and consequently the execution of, for example, repairs is slow and expensive, and retorts and "settings" which are out of use and cold are not quickly available for use, if required; the labor cost of operation is also high. Other systems,—as, for instance, the "bee hive" oven system,—for the distillation of bituminous coals are in use which are simpler and less expensive in construction and operation than the foregoing retort systems. Even in these, however, comparatively very large masses of the bituminous coal are subjected to heat applied to a portion of their surface; the distillation of the interior of the mass is, therefore, very slow. Furthermore, these systems are not designed to produce, and are not capable of producing, for sale or other external use a large yield, or good quality, of gas from the volatile portion of the coal.

One object of the present invention is to provide an expeditious method which will satisfactorily execute the work of distillation heretofore accomplished, by any and all of the foregoing systems; which will either wholly avoid, or very greatly reduce, the foregoing described construction, maintenance and operation costs, and other objectionable features of the retort system; which will be also superior to the "bee hive" oven and other similar systems, in that it will accomplish the work of distillation much more quickly, and can also yield almost the entire volatile content of the bituminous coal or other carbonaceous material as good gas for sale or other external use; which will possess the great superiority over all other systems that, as will be shown from the following description, its necessary construction and operation are so simple that it can be economically employed on any scale of magnitude whatever, even the smallest, whereas other systems which are capable of yielding equally good products require, for economical operation, large and expensive installations; which will be capable, unlike other systems, of being put into or out of operation with very great rapidity, and when in use its operation can be temporarily suspended, as desired, without expense or injury; and which will be capable of most satisfactorily distilling, and furnishing the best quality of products from, any kind or grade of carbonaceous matter whatever, which is not generally true of other systems which are capable of yielding the same products; for instance, in the "by-product coke oven", which yields one of the best hitherto produced grades of coke, great care must be exercised in choosing the kind of bituminous coal to be distilled; for if this coal shall not suitably contract, or shall expand, in being distilled to coke, it will break the weak walls of the retort either in the process of distillation or when the coke produced is being expelled from the retort.

Another object of the present invention is to provide for cheaply and rapidly obtaining lumps of good hard coke even in small quantity and by means of small and inexpensive apparatus from low grade bituminous coal or like carbonaceous material, thus making the latter usable in the manufacture of water and fuel gas and in many other arts.

A description of our process is as follows: The bituminous coal, or any other carbonaceous matter to be distilled, is disposed in layers or other forms of small transverse section, which layers or other forms are in immediate contact with, and separated from each other by, layers, or other forms, of refractory (infusible by heat) material. These layers, or other forms, of refractory material are of such kind,—preferably moderately finely divided fragments free from such finer material as would clog their interstices,—that they are freely permeable by gases, and they are so disposed as to form, with possible connecting passages, long continuous very porous ducts, which are thus easily traversable by gases throughout their entire length. The provision of these ducts, and the insurance of their maintenance during the process of distillation is important and provides for the carrying of air and hot gases, as will be explained hereafter. The transverse section of these ducts is, as already suggested, of such form,—for instance, broad and shallow,—that all of the refractory material forming the duct is either in immediate contact with, or very close to, the carbonaceous material to be distilled, which, as already described, immediately adjoins, or surrounds, the duct of refractory material. Heated gases are caused to traverse the ducts of refractory material either continuously or intermittently, according to the nature of the carbonaceous material being distilled and the nature of the products desired to be obtained therefrom. These heated gases may be produced by, and introduced into the ducts from, some external source; preferably, however, the refractory material forming the ducts shall be lumps of coke or "hard" coal (which are composed almost entirely of fixed carbon, the most infusible of substances), and the hot gases be generated by the combustion of a portion of this coke or hard coal, and also by the combustion of a portion, large or small as desired, of the combustible gases and vapors distilled from the surrounding carbonaceous material, which gases and vapors flow from the carbonaceous material into the ducts; air with or without steam for supporting this combustion is supplied in whatever quantity is necessary into the inlet end of the ducts, and the resulting hot combustion gases flow through the entire length of the ducts, thoroughly permeating the refractory material. The heat of the hot combustion gases is imparted to the carbonaceous material in two ways; a portion of the hot gases come directly into contact with the carbonaceous material, and thus yield up their heat directly and instantaneously, while another portion of the hot gases imparts its heat to the refractory material, whence this heat is radiated and conducted into the carbonaceous material. If, as may be desired, the passage of hot gases through the ducts is intermittent, then the refractory material will store heat from the hot gases during their flow, and again give this heat out to the carbonaceous material during the period of cessation of flow of the hot gases.

If it is desired to collect for sale or other external use the gases and vapors distilled from the carbonaceous material, then the admission of air and combustion shall be made intermittent, and this period of combustion shall be made as brief and the admission of air and combustion correspondingly as rapid, as desired; thereby the combustion of gases and vapors distilled from the carbonaceous material, which distillation takes place approximately at a uniform rate, can be rendered as small as desired. If the portion of the gases and vapors which it is desired to burn is so small as to not suffice for the generation of the total amount of heat required, then the refractory material shall be coke or hard coal, and its combustion shall replace to the necessary degree that of the distilled gases and vapors. These gases and vapors can during the period of cessation of air admission and combustion be removed by appropriate outlets, and stored or used externally, as desired.

As has already been stated, the providing of the ducts and the insuring of their maintenance by the employment of refractory material in their formation, is very important. The carbonaceous material which is to be distilled is usually not readily combustible until after distillation is largely completed; also, this carbonaceous material is frequently very fine and compact and not readily permeable by gases or air; also, and still more important, this carbonaceous material will, in general, in the process of being heated soften and "cake," or assume a coherent plastic condition, which will make it almost entirely impermeable by gases or air. Consequently, the ducts of refractory material are relied upon to convey the air necessary for combustion and the resulting gases of combustion throughout the carbonaceous material and impart to it the heat necessary for its distillation; these ducts also receive the gases and vapors distilled from the carbonaceous material and permit their instant combustion as distilled, or their conveyance to the exterior of the apparatus, as desired. Inasmuch as the charge including the ducts is movable, it follows that the weight thereof is constantly effective for consolidating the coal while plastic in the process of distillation, thereby producing dense and firm coke. It is possible to introduce additional or secondary air and thus by turning any unburned combustible gases to heat the charge.

The invention can be practiced by means of a variety of apparatus but forms of apparatus suitable for its practice will now be described in connection with the invention itself or, more accurately, with illustrative embodiments of the invention and in connection with the accompanying drawings in which—

Figure 1, is a view, principally in central section, illustrating apparatus in connection with which the invention can be practiced in one way. Fig. 2, is a similar view of apparatus in which the invention can be practiced in another way. Fig. 3, is a sectional view on the line 3—3 of Fig. 2, and Figs. 4 and 5, are a sectional elevation and section on line 5—5 illustrative of the practice of the invention in another way.

In describing the invention in connection with the apparatus illustrated, it is not the intention to limit the invention but it is the intention to explain it.

In Fig. 1, 1, is a chamber or receptacle the shape of which is not material, although it is intended to be, in that figure, rectangular in horizontal cross-section. 2, is a grate device shown as constructed to break the coke into lumps and remove it continuously or intermittently from the bed. 3, are layers, for instance, three to six inches thick, in the case of bituminous coal and in the case of any other material of a thickness dependent upon the nature of that material. These layers are in immediate contact with and are separated from each other by layers 4 of infusible porous material, such as pieces of brick or the like or pieces of coke, or hard coal, and being thus constituted are flexible and capable of responding to movements of expansion, contraction and travel of the bed. Not by way of limitation but for the sake of description, it will be assumed that coke is employed as the infusible or refractory material. The layers 4, constitute the porous ducts that extend continuously through the fuel. Assuming that the operation has been started and that it is desired to save the gas distilled from the carbonaceous material, air is introduced through $a$, by the connections $a^1$, and by reason of the slide or damper $b$, is caused to traverse the lower strata or layers or ducts 4, so that combustion takes place and the material of the ducts is heated. The slide $b^1$, is open and secondary air can be admitted at $c$, so that further combustion taking place in the upper ducts 4, serves to preheat the oncoming charge of fuel and ducts. The products of combustion pass out at $x$. The air can then be shut off and the distillation of the carbonaceous material continues by reason of the heat stored in the substance which forms the ducts and the distilled gas and vapors may be led off through the off-take connections $c^2$ or $x$ by way of the ducts 4. These operations are repeated and may from time to time be conducted from opposite sides of the apparatus, the fittings of which are duplicates. As the process continues the layers of carbonaceous material are converted into coke so that at the bottom there is coke of which some originally constituted the ducts and the rest was derived from the carbonaceous material, and the coke which is thus quickly made can be used in re-charging the apparatus along with fresh carbonaceous material in the manner described, that is to say, in such a way that porous ducts are provided. In starting, the contents of the chamber 1, may be heated by the introduction of hot gases from the auxiliary producer or generator $d$, or in any convenient manner, and the coke may be removed from the chamber 1, or, if preferred, steam may be introduced by $a^1$ in the chamber 1, and the coke therein used for the production of water gas in the well understood manner, or it may be used for the production of fuel gas.

In describing the practice of the invention in connection with Fig. 1, reference has been made to the stratification of the carbonaceous material and to the ducts as being horizontal; however, as shown in Fig. 2, the stratification is vertical and after all the exact form of the ducts or the manner in which they are arranged is not of the essence of the invention, the point is that the bed shall be sub-divided by movable porous ducts which extend through it and which are substantially continuous so that they afford passages for hot gases and vapors with the result that distillation takes place throughout the bed by the direct application of heat as distinguished from the use of impervious retorts or immovable and rigid or fixed devices.

In Fig. 2, 5 indicates the sub-divisions, layers or strata of the carbonaceous material and 6 are the porous ducts. The receptacle 7 in Fig. 2, may be of circular horizontal cross-section and the air with or without steam and gas may be conducted through the pipe $k$ by means of the connections $h$, for the air and $i$, for the gas which is distilled. $x^1$ is the off-take for products of combustion. In general the method as practiced in connection with the apparatus of Fig. 2, is the same as has been described, and the process may be started by introducing hot gas or air and combustible gas as has been described in connection with Fig. 1. The charges may be fed in at the top through the opening 8. In connection with Fig. 1 the material can be easily charged in horizontal layers and in connection with Fig. 2, in order to charge the material in vertical or upright layers, use may be made of a charger 9 consisting of suitably supported partitions 11. The space between the partitions 11, may be narrower at the top than at the bottom to facilitate the passage of material. The material for the ducts is charged between two of the partitions and the carbonaceous material is charged through the space between adjacent partitions and the charging may be done by hand or in any convenient way. It is possible when the charger is circular, to rotate it through 90° every once in a while and when this is done the layers are arranged so as to break joint while maintaining continuous ducts, and the result of this is shown in Figs. 4 and 5, in which 12 is the carbonaceous material and 13 are the porous ducts. Evidently after the process has been carried on the resulting coke may be used as the material with which to form the porous ducts so that in operating with low grade bituminous coal or the like it is only necessary to obtain a sufficient supply of coke or refractory material with which to begin the operation or with which to form the ducts initially.

By way of explanation it may be said that the present invention is applicable for distilling carbonaceous materials of such quality that they are practically incombustible until partly coked or carbonized and of such quality that when heated they tend to melt and run together forming a mass through which air cannot be passed successfully as by blasting or the like and of a quality which may expand or contract unduly when carbonized, and by the present invention such carbonaceous materials are converted into an excellent quality of coke in a cheap and if desired small apparatus in any quantity required and more rapidly and expeditiously than they can be converted by means of an elaborate and expensive apparatus of large size, so that such carbonaceous materials by our invention can be utilized for producing coke and from the coke fuel or water gas can be made, so that as a result, fuel or water gas can be made from carbonaceous materials which were hitherto utterly unsuited for the purpose, as it would not repay an ordinary gas works to install such expensive coke ovens and devices as were hitherto required for treating the qualities of coal in question.

What we claim is:

1. The method of distilling bituminous coal or other combustible carbonaceous material which consists in preparing and maintaining a stratiform bed of the material and of permeable refractory substance, and converting the material into coke by heating the material throughout the mass by direct internal combustion in contact with it.

2. The method of distilling bituminous coal or other combustible carbonaceous material which consists in preparing and maintaining a stratiform bed of the material and permeable refractory substance, and converting the material into coke by heating the material throughout the mass by intermittently blasting the permeable strata of refractory material to produce internal combustion and store heat throughout the mass in direct contact with the layers of the material.

3. The method of distilling bituminous coal or other carbonaceous material which consists in arranging the material and a refractory substance in the form of separate ducts extending continuously through the material from top to bottom thereof and converting the material into coke by passing hot gas through the ducts of refractory substance.

4. The method of distilling bituminous coal or other carbonaceous material which consists in arranging the material and a refractory substance in the form of separate yielding ducts extending continuously through the material from face to face thereof and converting the material into coke by passing hot gas through the ducts of refractory substance.

5. The method of distilling bituminous coal or other carbonaceous material which consists in preparing and maintaining a stratiform bed of the material and of permeable refractory substance, and converting the material into coke by passing hot gases through the strata of refractory substance.

JOHN M. RUSBY.
OWEN B. EVANS.

Witnesses:
A. B. STOUGHTON,
S. E. PATTERSON.